Patented May 8, 1923.

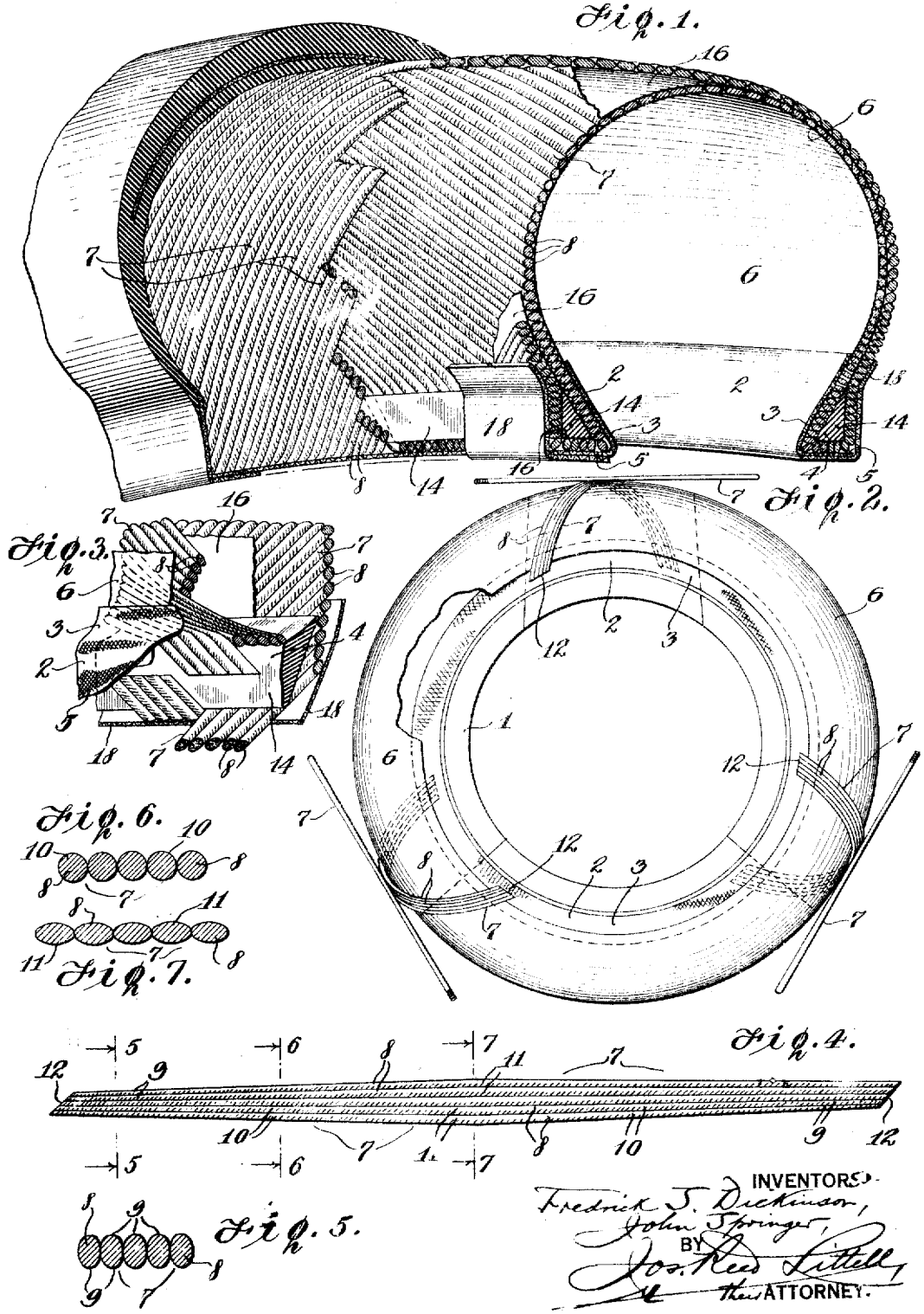

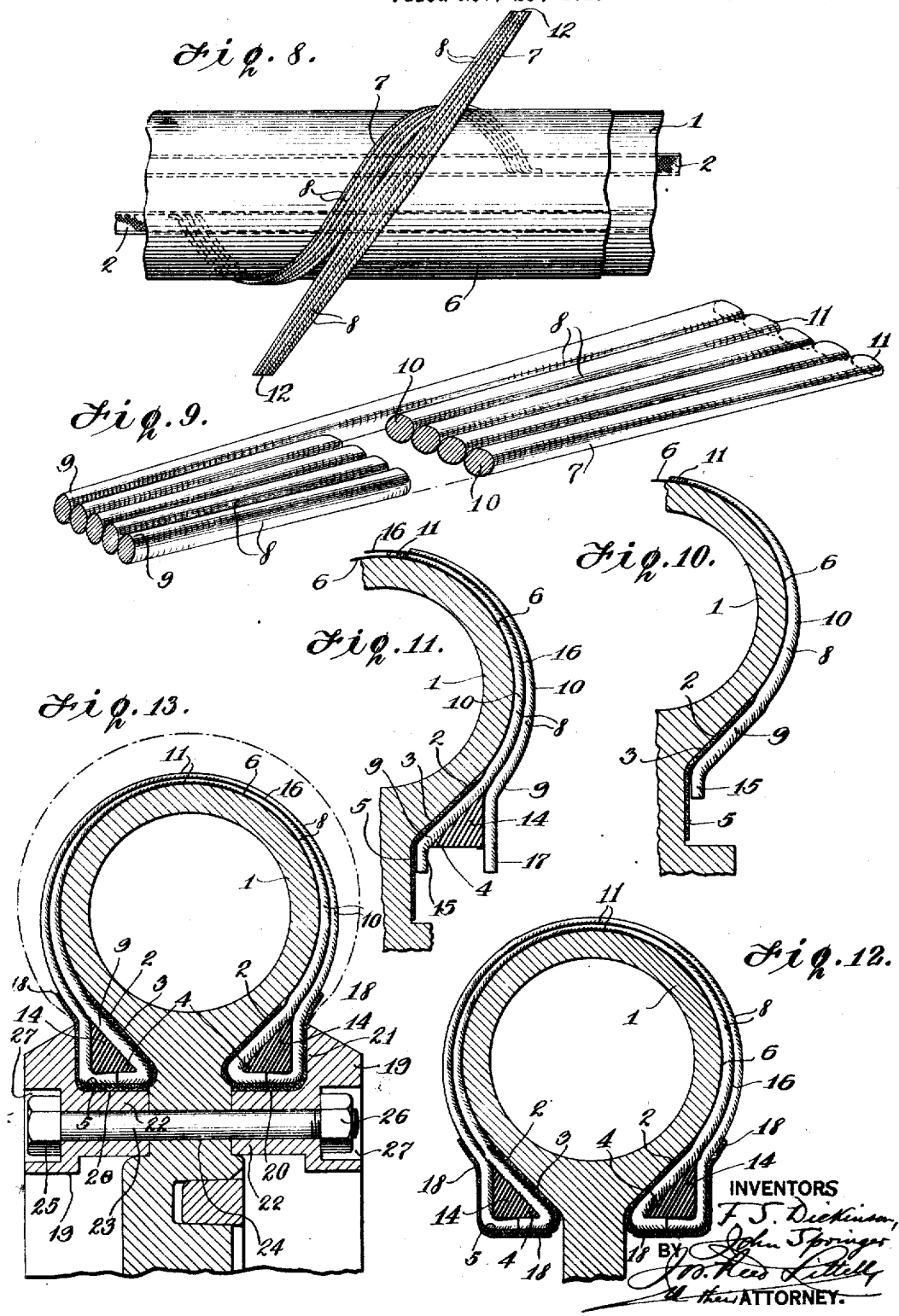

1,454,469

UNITED STATES PATENT OFFICE.

FREDERICK S. DICKINSON, OF NEW YORK, N. Y., AND JOHN SPRINGER, OF ATLANTIC HIGHLANDS, NEW JERSEY; SAID SPRINGER ASSIGNOR TO SAID DICKINSON.

PNEUMATIC TIRE.

Application filed November 20, 1919. Serial No. 339,273.

*To all whom it may concern:*

Be it known that we, FREDERICK S. DICKINSON, a resident of New York, in the county and State of New York, and JOHN SPRINGER, a resident of Atlantic Highlands, in the county of Monmouth and State of New Jersey, both citizens of the United States, have invented certain new and useful Improvements in Pneumatic Tires, of which the following is a specification.

This invention relates to pneumatic tires such as are now commonly used upon the wheels of automobiles and other vehicles and which comprise an elastic shoe or casing constituting the outer portion and tread of the tire and enclosing the inner air tube and having an internal body fabric or carcass formed by cords or threads.

Our invention has particular relation to the body fabric or carcass for such tires, and provides an improved carcass of the "cord" type.

In the heretofore accepted constructions of such carcasses whether of the single cord or "thread-fabric" type, no effective provision is made for attaining equality of tension in the laid cords or threads or for effectively maintaining such variable tension as is sometimes attained. The imperfect condition of the tension thus resulting creates such differences of action in the many cords or threads which constitute the carcass that, under the flexing or bending which ensues from depression under load, frictional movements occur between the cords or threads and produce a degree of heat sufficient to over-vulcanize the rubber elements embodied in the tire and thereby destroy the life of the rubber to an extent which causes early deterioration, and there then follows a severance of all bonds between the individual cords or between the respective plies of the carcass and a consequent separation between the cord carcass and the rubber body of the shoe or casing which constitutes the outer portion and tread of the tire. Furthermore, under such conditions of unequal tension, the cords or strands in which the tension is greatest are subject to all maximum strains or stresses in the use of the tire and therefore have to bear the brunt of service, in which circumstances the loads are distributed over only a few cords instead of being borne equally by all the cords constituting the carcass.

The object of our present invention is to overcome the disadvantages and objectionable conditions as above set forth and to provide an improved construction whereby uniform desired conditions of tension will be effectively maintained throughout the entire cord fabric carcass, which will afford a tire structure of superior strength and durability, and which will enable a more economical and rapid manufacture of the cord carcass of the class to which our invention relates.

In the drawings—

Figure 1 is a perspective view, partly in section, illustrating a portion of a tire having two plies of cord laid according to our invention.

Fig. 2 is a side view showing the core or mandrel as employed in the construction of the improved carcass and illustrating the laying of the strips of cords thereon.

Fig. 3 is a detail perspective view, partly in section, illustrating the laid position of the strips of cords at the bead-edge construction.

Fig. 4 is a plan view of one of the strips or units made up of a plurality of cords, as employed in our present improved carcass construction.

Fig. 5 is a detail cross-section, on an enlarged scale, taken on the line 5—5, Fig. 4.

Fig. 6 is a detail cross-section, on an enlarged scale, taken on the line 6—6, Fig. 4.

Fig. 7 is a detail cross-section, on an enlarged scale, taken on the line 7—7, Fig. 4.

Fig. 8 is a plan view of the periphery of a portion of the core or mandrel over which the cord strips are laid in the construction of the improved carcass and illustrating the position of said strips initially and in completed laid position.

Fig. 9 is a detail perspective view, on an enlarged scale and partly in section, illustrating a half-portion of one of the cord strip units.

Fig. 10 is a detail cross-section through the core or mandrel and illustrating the initial lay of the cord of the first ply at the bead-edge portion as produced in the construction of the improved carcass.

Fig. 11 is a detail cross-section through the core or mandrel and illustrating the initial laid position of the cords of superposed plies and the insertion of the bead-ring at the bead-edge portion as produced in the improved construction according to our invention.

Fig. 12 is a detail cross-section through the core or mandrel and illustrating the final complete lay of the cords of superposed plies over the core and in the completed bead-edge construction.

Fig. 13 is a detail cross-section through the core or mandrel on which the cords are laid with the superposed plies in position and in the completed bead-edge construction, and illustrating clamping rings which are employed in the construction of the carcass in connection with the completed lay to maintain the cords against any slippage or displacement during the handling in the application of the side walls and tread stock of the casing and the vulcanizing thereof in the final completion of the tire shoe or casing having the carcass according to our improved construction.

Corresponding parts in all the Figures are denoted by the same reference characters.

Referring to the drawings, 1 designates a core or mandrel over which the cords are laid in the construction of the cord body fabric as comprised in our present invention, said core constituting a former and being annular and having a cross-sectional contour corresponding to the desired inner cross-sectional contour of the tire shoe or casing. In practice, said annular core is made up of sections or segments adapted to be separated so that the core can be readily removed from within the finished tire shoe or casing.

In the construction of the improved cord body fabric or carcass as comprised in our present invention, the circumferential surface of the core is first coated with an adhesive, perferably a rubber cement, and there is then placed at opposite sides of the core, at points corresponding to what will be the inner bead portion of the tire casing, a strip of frictioned fabric 2, which will adhere to the adhesive coating upon the core and be positionally maintained thereby. Said frictioned fabric strips extend annularly with relation to the core and are of a width sufficient to extend upwardly, as at 3, from the toe, indicated at 4, of the bead in the finished tire casing a suitable distance with relation to the bead-edge construction (say, in practice, approximately 1 inch) and a distance below the toe of the bead, as at 5, sufficient to fully cover the base of the bead in the final condition of construction. The lower depending portion 5 of the frictioned fabric strip is free and not in adhesive connection with the neck of the core. There is then placed over the core an envelope or covering, 6, having an adhesive quality, preferably uncured sheet rubber, which will adhere to the adhesive coating of the core and will itself constitute an adhesive element. This covering extends over the circumferential surface of the core, and preferably extends over the frictioned fabric strips 2—2 to a point coincident with that of the bead toe. The cords are then laid over the rubber-covered core under the conditions and in the manner hereinafter described.

In our present invention, the cord carcass is constituted by a plurality of strip units, 7, each consisting of a plurality of cords, 8, assembled together side by side. Any suitable number of cords may be employed in each strip unit, but preferably we employ five cord lengths as herein shown (Figs. 4, 8 and 9), it being understood that the width of the strip unit is limited in its relation to the area of the variable circumference of the core or former which is to be covered by the unit in the laying of the strips obliquely over the core side by side so that they effectively cover the entire area of the variable circumference thereof. Each of said strip units is first produced in the shape and condition hereinafter described, and the plurality of cord lengths constituting the unit are rubber treated so that they have an adhesive quality and maintain the shape and assembled construction in which the unit is produced. In the completed cord strip unit, the assembled plurality of cord lengths are each respectively formed so that at the terminal ends at the bead-edge portion the cords are flattened, as at 9 (Figs. 5 and 9), the narrow diameter of said flattened ends being at right angles to the annulus of the tire, and from said flattened end portions the cords gradually and progressively merge into a true cylindrical cross-section, as at 10 (see Figs. 6 and 9), at the side portions above the bead, and from said cylindrical side portions the cords again gradually merge into a flattened central portion, as at 11 (see Figs. 7 and 9), in which the narrow diameter is at right angles to the narrow diameter of the flattened end portions 9 and is in the plane of the annulus of the tire, said flattened central portions 11 being at the peripheral or tread portion above the sides. The cord lengths are initially of cylindrical cross-section throughout their length, and are compressed to impart the variable contour as just described in the process of producing the cord strip unit, which may be done by any adapted apparatus or means, and the cohesion of the cord lengths in this contour is thereafter maintained. The completed strip unit is therefore wider at its central or tread portion 11 and gradually narrows to its intermediate or side portions 10—10 and to their terminal ends 9—9 at the bead, which ends are cut at a corresponding acute angle, as at 12, which will conform to the annular line of the bead when the cord strips are laid in their oblique position. As will be understood from the foregoing description, each strip unit 7 is so formed that it will cover accurately and at all points the proportional surface area of the core from the bead base, and thus in the formation of each strip unit compensation is provided for the increasing progressive variable circumference from the bead-edge to the tread throughout the entire path in which the strip is laid or positioned.

The cord strip units are of such predetermined length that they will extend over the core, at the desired oblique or diagonal angle of lay, from a point on one side corresponding to the point of the bead-toe contact 4 to a corresponding point on the opposite side of the core, with sufficient additional length at each end of the strip to permit said ends to be laid under the bead-ring part way (say one-half) across its base, due calculation being further provided in the length of the strip to compensate for the degree of stretch to be imparted to it under the conditions of tension in which it is laid.

The cord strip units employed in our improved construction are laid in the shape and condition as above described over the core or former side by side until the full circumferential area of the annular core at the sides and tread is entirely covered. In the act of laying, the strips are first placed across the periphery of the core in plane therewith and at an angle thereto, as indicated by the first position illustrated in Figs. 2 and 8, and the end portions of the strip are then brought downwardly over the sides of the core and to contact with the frictioned fabric strips 2—2, at the bead-edge portion, in the oblique or diagonal final position as illustrated in Figs. 2 and 8, and are adhesively maintained in their laid position by the uncured sheet rubber covering 6 and the frictioned fabric strips. This positional laying of the cord strip units may be effected by any suitable machine action or in any adapted manner.

The foregoing conditions of construction as involved in our present invention, in which there is employed a plurality of cord strip units each made up of a plurality of cord lengths and shaped so that in the oblique position of lay the cord unit will cover entirely and at all points the proportional surface area of the variable circumference of the core, the proportions and shape of each strip unit being predetermined with relation to the end areas to be covered, enables the laying of the strip units simultaneously at a plurality of points on the core, and the construction is thus adapted for very rapid and inexpensive conditions of manufacture. In the construction of the carcass by the laying of the strip units simultaneously at a plurality of points, the respective starting strips are first placed at predetermined and equi-distant points (which conditions are illustrated in Fig. 2), and the succeeding strips are then laid up simultaneously from each of said starting points until the full area of the core is covered. In this operation, it will be understood that the core is revolved in a progressive movement, in which the laying of the successive strip units simultaneously at the various starting points will progress uniformly, and the location of the several starting points is such that the uniform and progressive simultaneous laying of the strips between said points will finally cover accurately the full circumferential area between each of the starting strips at said separated points. However, if preferred, to produce the improved construction according to our present invention, the cord strip units may be laid and positioned starting from a single point and with a single strip and from thence laying the strips successively and singly as the core advanced in its revoluble movement until the full area of the core is covered and the final laid strip terminates at the side of the initial starting strip, which conditions of the successive lay of the strips side by side is indicated in Fig. 8.

The conditions of uniform tension which are enabled by our improved construction are an important feature of the invention. In laying the cord units in the manner before described, the strips are stretched over the core to a condition of uniform tension in each and all of the strips, which uniform tensional lay may be effected by any suitable machine action or in any adapted manner, and the tensioned conditions of lay are maintained by the adhesive quality of the rubber covering 6 on the core and the frictioned fabric strips 2. This tensioned condition in uniform degree is effected in each cord strip unit as they are successively laid and is maintained in the progressive laying operation until the full area of the core is covered by the strips, for which purpose there may be additionally employed suitable clamping mechanism which will come into operation successively at the bead-edge portion of the strips as each strip is laid and will have a positive action to clamp the laid strip in its applied position on the core. When the strips are laid and tensioned as before described, the tensional condition is then permanently fixed by the application of a bead strip or member, 14, which is a reinforced annular ring of approximately triangular cross-section and of reinforced vulcanized rubber or other suitable material, the bead-ring being placed against the end portion of the cord strip units which contacts with the frictioned fabric strips 2, just above the terminal edge or end portion of the cord strips, which terminal edge or end portion is folded or pressed back under the toe 4 of the bead and applied so that it adheres to the under portion or base of the bead and extends partly across the base in the final construction of the completely laid cord carcass.

The initial completed and tensioned lay of an under ply of the cord strips is illustrated in Fig. 10, in which the end portion 9 of the cord strip units is in adhesive connection with the upper portion 3 of the frictioned fabric strips 2 and extends a short distance beneath the point at which the bead-toe will come, as at 15. This laying of the cord strip units in position over the core as shown in Fig. 10 completes the initial lay of the under ply of the cord fabric carcass, and in the provision of a two-ply carcass constructed according to our invention the second ply is then laid. Preliminary to the laying of the second ply, an envelope or covering, 16, having an adhesive quality, preferably uncured sheet rubber, and corresponding to the first envelope or covering 6 which is laid over the core, is placed over the first ply of the cord strip units and the bead-ring 14 is placed in position. The second ply constituted by the cord strip units is then laid over the rubber envelope or covering 16 in the same manner as to laying and tensioning the construction of the cord fabric as that hereinbefore described with reference to the laying of the first ply, the uniform tension and positional lay of the cord strips of the second ply being maintained by the adhesive quality of the rubber covering 16 and the end portion 9 of the cord strips of the second ply being laid against and in adhesive contact with the outer face of the bead-ring 14 and having the terminal edge or end, as at 17, projecting below the bead-ring a sufficient distance to be folded or pressed back and applied to cover approximately one-half of the under portion or base of the bead-ring, this initial positional and relative lay of the two plies being illustrated in Fig. 11. In the lay of the second ply, the cord unit strips are laid at an angle or in oblique position opposite to the angle of lay or oblique position of the cord strips of the first ply, as shown in Fig. 1, the lay of the two plies thus being at reverse diagonal angles. It will be understood that the laying of the second ply of the cord strip units corresponds to that of the first ply in respect to uniformity of tension, the features of construction, and the manner of laying and positional relationship of the cord strips, and compensation for the increasing variable circumference which is covered at all points of the surface area by the strips which cover their correct proportional surface area.

In the practical construction of the improved carcass, when the initial lay of the two plies is completed as shown in Fig. 11, the respective terminal ends or edges 15 of the strips of the first ply and 17 of the strips of the second ply are then folded up or pressed back under the bead-ring so that they cover and adhere to the under or base portion thereof with the terminal end edges of the strips of the respective plies abutting, as shown in Fig. 12, and the free depending lower portion 5 of the frictioned fabric strips 2 is then turned upwardly against and across the folded or turned ends of the cord strips, which underlie the bead-ring, and extends in adhesive connection therewith to the heel of the bead. A supplementary frictioned fabric strip, 18, which we term a "chafing strip" in its relation to the wheel rim, is then placed in position in contact with the underlying end of the frictioned fabric strip 2 and extends from the bead-toe end and around the bead-heel and upward against the outer surface of the second ply of cord strips to a point above the bead portion which will be above the contact surface of the rim-flange when the tire is in use. The final completed lay of the two plies of cord strip units, in which the frictioned fabric strips 2 and the chafing strips of frictioned fabric 18 operate to securely bind the cord strips in their positioned and uniform tensional lay and secure the bead construction, is illustrated in Fig. 12, and after the completion of the laying up of the cord carcass in the improved construction constituting our present invention, as shown in Fig. 12, the rubber body of the tire shoe or casing, consisting of the side walls, cushion stock, breaker strip and thread stock (as indicated in Fig. 1) is applied in the usual manner in this art and the casing is then vulcanized and finished and ready for commercial use under any of the usual or well-known processes.

When the construction of the carcass has been completed in its laid and secured tensional condition, as shown in Fig. 12, and prior to the application of the rubber body of the tire shoe or casing, in the subsequent finishing of the complete tire and the embodying of the improved cord caracss therein we prefer to clamp the cords of the carcass in their tensioned and laid position, to maintain or make positive their positional and tensioned lay during the handling in the application of the side walls, cushion stock, breaker strip and tread stock of the rubber body of the tire casing and during the finishing of the latter in the vulcanizing process. For this purpose, we apply to the cord carcass, when its lay has been completed as shown in Fig. 12, metallic rings, 19—19, extending annularly at the bead portion of the laid carcass at the respective sides thereof, as shown in Fig. 13. These clamping rings are turned or shaped at the upper portion of their inner face, as at 20, to conform to the cross-sectional contour of the bead-toe of the completed carcass, and extend upwardly, as at 21, a suitable distance (say, approximately one inch) above the heel of the bead, and also extend downwardly, as at 22, beneath the bead-base a suitable distance to accommodate the means by which they are clamped in position. Said means preferably consists of transverse bolts, 23, passing through corresponding openings in the neck, 24, of the core or mandrel 1 and through the base portion 22 of the respective rings 19—19 at opposite sides of the core, the head, 25, and the nut, 26, of the bolt-securing means being preferably accommodated in recesses, as at 27, provided in the outer faces of the respective clamping rings. When the clamping rings, as just described, are applied in connection with the bead portion of the completed and tensioned lay of the cord carcass, any slippage or displacement of the cord during the handling incident to the application of the rubber body of the tire shoe or casing or the subsequent vulcanizing thereof is positively precluded. In practive, the clamping rings 19—19 preferably become portions of the molds in which the tire shoe or casing is finally vulcanized, the molds being turned out or recessed to receive and accommodate the contour of the rings, and after the vulcanizing is completed and the finished shoe or casing is removed from the molds said rings are then released and detached from the finished casing.

It will be understood that the conditions of our improved construction are not limited to the production of the tire carcasses in any special number of plies, but are adapted for carcasses having any desired plurality of plies, which may be successively laid in the conditions and manner as hereinbefore described. Nor is the carrying out of our improved construction dependent upon any particular mechanism or apparatus for constructing the carcass by machine action in the various steps involved, as machines of various types may be employed, particularly a machine for manufacturing tires according to the construction constituting our present invention and which is the subject-matter of a separate application for patent.

It will also be understood that our improved construction in its general character and generic scope is not restricted to the employment of the cords in unitary strips each made up of a plurality of cord lengths, but that under some conditions as involved in the generic character of our improvements single lengths of cord may be employed to produce the cord fabric plies, according to the features of the construction as set forth in our co-pending application for patent Serial No. 339,272.

Our improved construction of cord carcass tires, and the advantages secured thereby, will be readily understood by those skilled in the art to which our invention appertains. The improved construction enables the laying of the cords rapidly in a simple and efficient manner and with economical conditions of manufacture, and the effective and convenient formation of the bead-edge in connection with the frictioned fabric strips, and coincident with the construction of the cord fabric uniform desired conditions of tension are effected and the cords securely maintained in the condition of tension under which they are laid by the cohesive bonds which are established in our improved construction during the laying of the cords and until the final completion of the finished carcass. The construction thus produces a simple and improved cord carcass which will afford a tire structure of superior strength and durability.

Having thus described our invention, we claim and desire to secure by Letters Patent:

1. An internal body fabric for the shoe or casing of pneumatic tires, comprising a plurality of cord strip units each consisting of a plurality of cord lengths assembled together side by side and so shaped in cross-section that each strip unit will cover at all points the proportional surface area from the bead-edge to the tread portion in a path oblique to the annulus of the tire and compensate for the increasing progressive variable circumference throughout the path in which the strip is laid, said strip units extending in series in successive position side by side and entirely covering in series the variable circumference of the tire.

2. An internal body fabric for the shoe or casing of pneumatic tires, comprising a plurality of cord strip units each consisting of a plurality of cord lengths assembled together side by side and having a cross-sectional contour which is flattened at the bead-edge portion with the narrow diameter of said flattened ends at right angles to the annulus of the tire and merging from said flattened ends into a cylindrical cross-section and from thence merging into a flattened central portion in which the narrow diameter is in the plane of the annulus of the tire, whereby each strip unit will cover at all points the proportional surface area from the bead-edge to the tread portion in a path oblique to the annulus of the tire and compensate for the increasing progressive variable circumference throughout the path in which the strip is laid, said strip units extending in series in successive position side by side and entirely covering in series the variable circumference of the tire.

3. An internal body fabric for the shoe or casing of pneumatic tires, comprising a plurality of cord strip units each consisting of a plurality of cord lengths assembled together side by side and having their greatest width at the central portion and from thence gradually tapering in width to their end portions, whereby each strip unit will cover the proportional surface area from the bead-edge to the tread portion in a path oblique to the annulus of the tire and compensate for the increasing progressive variable circumference throughout the path in which the strip is laid, said strip units extending in series in oblique or diagonal position and successively side by side and entirely covering in series the variable circumference of the tire.

4. An internal body fabric for the shoe or casing of pneumatic tires, comprising a plurality of cord strip units each consisting of a plurality of cord lengths assembled together side by side and having a flattened greatest width at the central portion and from thence tapering in width to the end portions and gradually merging from said central portion into flattened end portions having their narrow diameter at right angles to the narrow diameter of the flattened central portion, whereby each strip unit will cover at all points the proportional surface area from the bead-edge to the tread portion in a path oblique to the annulus of the tire and compensate for the increasing progressive variable circumference throughout the path in which the strip is laid, said strip units extending in series in oblique or diagonal position and successively side by side and entirely covering in series the variable circumference of the tire.

5. An internal body fabric for the shoe or casing of pneumatic tires, comprising a plurality of cord lengths extending in successive position side by side and so shaped in cross-section that the successive lay of said lengths covers at all points the proportional surface area from the bead-edge to the tread portion in a path oblique to the annulus of the tire and compensates for the increasing progressive variable circumference throughout the path in which the cord lengths are laid.

6. An internal body fabric for the shoe or casing of pneumatic tires, comprising a plurality of cord units extending in series in successive position side by side and so shaped in cross-section that each unit will cover the proportional surface area at the sides and tread portion in a path oblique to the annulus of the tire and the successive lay of said units will compensate for the increasing progressive variable circumference in the path in which the cord unit is laid.

In testimony whereof we have signed the foregoing specification.

FREDRICK S. DICKINSON.
JOHN SPRINGER.